United States Patent Office 3,014,916
Patented Dec. 26, 1961

3,014,916
PYRAZOLE DERIVATIVES
Derek Ernest Wright, Ilford, England, assignor to May & Baker Limited, Dagenham, England
No Drawing. Filed Jan. 14, 1960, Ser. No. 2,345
Claims priority, application Great Britain Jan. 22, 1959
3 Claims. (Cl. 260—310)

This invention relates to new pyrazole derivatives of therapeutic utility, to processes for their preparation and to pharmaceutical compositions containing them.

The new pyrazoles of the present invention are the N-benzylpyrazoles of the general formula:

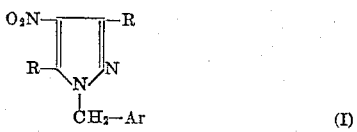

(I)

wherein Ar represents a phenyl group substituted by one or more substituents (preferably one or two) selected from alkyl, alkoxy, alkoxy carbonyl, alkyl mercapto, or alkyl sulphonyl groups containing not more than six carbon atoms, acylamido including sulphonamido, amidino, amino or substituted amino such as lower alkylamino and di(lower)alkylamino, aryl, cyano, halogen, hydroxy, nitro, sulphinic or sulphonic acid groups, and R represents a hydrogen atom or an alkyl group containing not more than six carbon atoms.

These new compounds show useful activity as antiprotozoal agents, especially in the treatment of amoebiasis and trichomoniasis. The preferred compounds are those in which the phenyl group Ar carries a substituent in the para-position. Of outstanding utility is N-(4-methylsulphonylbenzyl)-4-nitropyrazole. The corresponding N-2-methylsulphonylbenzyl compound, viz. N-(2-methylsulphonylbenzyl)-4-nitropyrazole, is also of particular importance.

According to a feature of the invention, the new pyrazoles of general Formula I are prepared by a process which comprises condensing a nitropyrazole of the general formula:

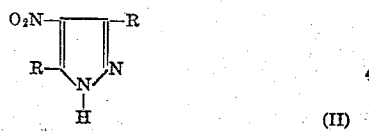

(II)

with a compound of the general formula:

$$X—CH_2—Ar_1 \qquad (III)$$

(wherein X represents the acid residue of a reactive ester such as a halogen atom or a sulphuric or sulphonic ester residue, $Ar_1$ is the same as Ar as hereinbefore defined or a grouping convertible thereto, and R is as hereinbefore defined) and, if necessary, converting by known methods the grouping $Ar_1$ to the group Ar. The condensation is preferably carried out by heating the reactants in an inert organic solvent such as an alcohol, ketone (e.g. acetone) or a benzene hydrocarbon in the presence of an acid binding agent such as an alkali metal or derivative thereof, including carbonates, alkoxides, amides and hydrides, or a tertiary base such as quinoline.

According to a further feature of the invention, the pyrazoles of general Formula I are prepared by nitrating a compound of the general formula:

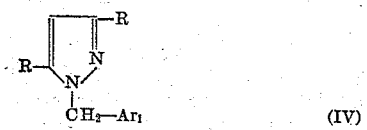

(IV)

(wherein $Ar_1$ and R are as hereinbefore defined) by known methods for introducing into the 4-position of the pyrazole nucleus a nitro group, for example, using a mixture of concentrated nitric and sulphuric acids, and if necessary converting by known methods the group $Ar_1$ to the group Ar as hereinbefore defined.

The compounds of general Formula IV may be prepared by reacting a pyrazole compound of general formula:

(V)

(where R is as hereinbefore defined) with a compound of general Formula III.

According to a still further feature of the invention, the pyrazoles of general formula I where R represents a hydrogen atom are prepared by condensing a hydrazine derivative of the general formula:

$$NH_2—NH—CH_2—Ar_1 \qquad (VI)$$

(wherein $Ar_1$ is as hereinbefore defined) with nitromalondialdehyde of the formula:

(VII)

or a suitable derivative thereof such as acetal, diacetate or sodium derivative, and if necessary converting by known methods the group $Ar_1$ to the group Ar as hereinbefore defined. The condensation is preferably effected by heating the reactants in an inert solvent such as an alcohol, ketone or a benzene hydrocarbon. A condensing agent such as zinc chloride or sulphuric acid may optionally be present.

In the aforesaid processes the grouping $Ar_1$ may be, for example, an unsubstituted phenyl group convertible into a group Ar e.g. p-nitrophenyl by nitration, or phenyl substituted by a sulphinic acid group by reaction with chlorosulphonic acid and reductive hydrolysis, e.g. using sodium sulphite and an alkali metal hydroxide in the presence of water, of the resultant chlorosulphonylphenyl compound. A substituent on the phenyl group Ar of the product may be converted into a different substituent, for example, a cyano substituent may be converted into amidino by treatment with ethanol and hydrogen chloride, and reaction of the product with ammonia, and a sulphinic acid group may be converted to alkylsulphonyl by reaction with an alkylating agent, such as dimethylsulphate.

By the term "known methods" as used in the specification and accompanying claims is meant methods heretofor used or described in the chemical literature.

The following examples illustrate the invention.

*Example I*

4-nitropyrazole (13.2 g.) was dissolved in 2-ethoxyethanol (120 ml.) and to the solution was added anhydrous potassium carbonate (8.4 g.) and p-methylsulphonylbenzyl bromide (30.0 g.). The mixture was stirred and heated at 100° C. for 18 hours, cooled in ice, the crystalline solid filtered off, washed by grinding to a paste with water and refiltering and dried at 65° C. Recrystallisation from nitromethane (130 ml.) gave N-(4-methylsulphonylbenzyl)-4-nitropyrazole as colourless needles, M.P. 193–194° C.

The following compounds were similarly prepared from 4-nitropyrazole by reaction with the appropriate benzyl halide:

N-(2-methylsulphonylbenzyl)-4-nitropyrazole, M.P. 165–167° C. (after recrystallisation from 2-ethoxyethanol), N-(4-ethylsulphonylbenzyl)-4-nitropyrazole, M.P. 131.5–133° C. (after recrystallisation from ethanol),
N-(4-acetamidobenzyl)-4-nitropyrazole, M.P. 221–223° C. (after recrystallisation from ethanol), and
N-(4-methylthiobenzyl)-4-nitropyrazole, M.P. 72–74° C. (after recrystallisation from light petroleum, B.P. 110–120° C.)

*Example II*

3:5-dimethyl-4-nitropyrazole (37.5 g.) was dissolved in 2-ethoxyethanol (300 ml.) and to the solution was added anhydrous potassium carbonate (19.0 g.) followed by 2:4-dichlorobenzyl chloride (53.0 g.). The mixture was stirred and heated at 100° C. for 21 hours, then cooled in ice. The crystalline solid was filtered off, washed by grinding to a paste with water and refiltering, and dried at 35° C. Recrystallisation from ethanol (200 ml.) gave N-(2:4-dichlorobenzyl)-3:5-dimethyl-4-nitropyrazole as colourless prisms, M.P. 95–97° C.

3,5 - diethyl - N - (4 - methylsulphonylbenzyl) - 4 - nitropyrazole, M.P. 110–112° C., after recrystallisation from ethanol, was similarly prepared from 3,5-diethyl-4-nitropyrazole by reaction with 4-methylsulphonylbenzyl chloride.

*Example III*

4-nitropyrazole (2.2 g.) was dissolved in 2-ethoxyethanol (20 ml.) and to the solution was added an anhydrous potassium carbonate (1.4 g.) followed by p-nitrobenzyl chloride (3.4 g.) The mixture was stirred and heated at 100° C. for 20 hours, cooled in ice, the crystalline solid filtered off and washed by grinding to a paste with water and refiltering and dried at 65° C. Recrystallisation from ethanol (24 ml.) gave N-(4-nitrobenzyl)-4-nitropyrazole as pale yellow needles, M.P. 116–117° C.

*Example IV*

4-nitropyrazole (2.2 g.) was dissolved in 2-ethoxyethanol (20 ml.) and to the solution was added anhydrous potassium carbonate (1.4 g.) followed by p-cyanobenzyl chloride (3.0 g.). The resulting mixture was stirred and heated at 100° C. for 6 hours, cooled, and added to water (100 ml.). The resulting suspension was made just alkaline to phenolphthalein with 2 N sodium hydroxide, and the solid was filtered off, washed with water, and dried at 65° C. Recrystallisation from ethanol (37 ml.) gave N-(4-cyanobenzyl)-4-nitro-pyrazole as colourless needles, M.P. 127–129° C.

The following compounds were similarly prepared from 4-nitropyrazole or 3:5-dimethyl-4-nitropyrazole by reaction with the appropriate benzyl halide:

3:5 - dimethyl - N - (4 - methylsulphonylbenzyl) - 4 - nitropyrazole, M.P. 176–178° C. (after recrystallisation from 2-ethoxyethanol),
N-(2:4-dichlorobenzyl)-4-nitropyrazole, M.P. 96–97° C. (after recrystallisation from methanol), and
3:5 - dimethyl - N -(4 - nitrobenzyl) - 4 - nitropyrazole, M.P. 124–126° C. (after recrystallisation from ethanol).

*Example V*

N-(4-cyanobenzyl)-4-nitropyrazole (44.6 g.) (prepared as described in Example IV) was dissolved in dry chloroform (600 ml.), dry ethanol (45 ml.) added, and the resulting solution was gassed with anhydrous hydrogen chloride for 20 minutes, with cooling in ice water. The solution was allowed to stand at room temperature for six days, and added to anhydrous ether (1.5 l.). The resulting precipitated solid was filtered off, washed with anhydrous ether, and dried in vacuo over calcium chloride. The solid was quickly powdered in a mortar and then added to saturated anhydrous alcoholic ammonia (400 ml.). The mixture was kept at room temperature for 1 hour, then heated at 50–60° C. for 6 hours, then kept at room temperature overnight. The resulting solution was evaporated to dryness, and the residue dissolved in water (250 ml.). Concentrated hydrochloric acid (5 ml.) was added to the charcoaled solution which was then refrigerated overnight giving N-(4-amidinobenzyl)-4-nitropyrazole monohydrochloride monohydrate as colourless prisms, M.P. 188–190° C.

*Example VI*

To a solution of sodium (0.46 g.) in dry ethanol (20 ml.) was added 4-nitropyrazole (2.3 g.) and the mixture evaporated to dryness in vacuo at 100° C. The resulting sodio-derivative was suspended in dry toluene (20 ml.), veratryl chloride (3.7 g.) (prepared as described by Krohner, Schreiss and Gottstein Ber. Dtsch. Chem. Ges. 84, 131 (1951)), added, and the mixture was stirred and heated at 100° C. for 8 hours. It was then filtered whilst still hot and the filtrate evaporated to dryness. The residual gum was triturated with ether, whereupon a solid (1.8 g.) separated. Two recrystallisations from light petroleum (B.P. 80–100° C.) gave colourless felted needles of N - (3,4 - dimethoxybenzyl) - 4 - nitropyrazole (0.5 g.), M.P. 80–81° C.

*Example VII*

To a solution of N-(4-methylsulphonyl)pyrazole (1.0 g.) in concentrated sulphuric acid (5 ml.) was added dropwise with stirring and cooling, a mixture of concentration nitric acid (3 ml.) and concentrated sulphuric acid (3 ml.), keeping the reaction mixture at 15° C. throughout. The mixture was maintained at room temperature for 16 hours and added to ice (50 g.), whereupon a pale yellow solid (1.1 g.) was precipitated; it had M.P. 175–185° C. Recrystallisation from nitromethane (3 ml.) gave pale yellow prisms of N-(4-methylsulphonylbenzyl)-4-nitropyrazole (0.7 g.), M.P. 189–192° C.

The N-(4-methylsulphonylbenzyl)pyrazole used as starting material was prepared as follows:

To a solution of sodium (1.38 g.) in dry ethanol (50 ml.) was added pyrazole (4.08 g.) and the resulting solution evaporated to dryness in vacuo. The sodio-derivative so obtained was suspended in toluene (60 ml.), p-methylsulphonyl bromide (15.0 g.) added, and the mixture stirred and heated at 100° C. for 18 hours. The resulting suspension was filtered whilst still hot, and the toluene solution decolourised with charcoal. The pale yellow solution so obtained upon refrigeration deposited colourless clusters of needles (5.3 g.) of N-(4-methylsulphonylbenzyl)pyrazole, M.P. 75° C.

*Example VIII*

4 - nitropyrazole (20 g.) was mixed with 2 - ethoxyethanol (130 ml.), anhydrous potassium carbonate (12 g.), and benzyl bromide (21 ml.) added. The mixture was stirred and heated at 100° C. for 18 hours, cooled, filtered, and the filtrate evaporated to dryness under reduced pressure. The residue was dissolved in ethyl acetate (80 ml.), and the solution charcoaled, then diluted with light petroleum (550 ml.; B.P. 60–80° C.), and refrigerated giving N-benzyl-4-nitropyrazole as colourless needles (12.4 g.), M.P. 48–50° C. Evaporation of the liquors gave a second crop (15.0 g.), M.P. 48–50° C.

N-benzyl-4-nitropyrazole (2.0 g.) was added portionwise to chlorosulphonic acid (10 ml.) with stirring and cooling, keeping the reaction temperature at 5–7° C. throughout. The solution was allowed to stand at room temperature for 24 hours and then cautiously added to ice and the precipitated gum extracted thrice with chloroform. The chloroform extracts yielded a colourless glass, which on recrystallisation from benzene-light petroleum (B.P. 60–80° C.) gave colourless prisms (0.5 g.) of N-(4-chlorosulphonylbenzyl) - 4 - nitropyrazole, M.P. 105–109.5° C. A further recrystallisation from ethyl acetate-light petroleum (B.P. 60–80° C.) raised the melting point to 109–110° C.

To a solution of anhydrous sodium sulphite (6.4 g.) in water (30 ml.) was added N-(4-chlorosulphonylbenzyl)-4-nitropyrazole (3.0 g.) followed by 2 N sodium hydroxide (11 ml.) and 1 drop of "Lissapol" to ensure complete wetting. The mixture was stirred at 35–40° C. for 3 hours, and then filtered from a little unchanged sulphonyl chloride (0.4 g.) and the filtrate acidified with dilute sulphuric acid. The colourless crystalline solid was collected and recrystallised from ethanol (14 ml.) to give 4-nitropyrazol-1-yl-methylbenzene-4'-sulphinic acid (1.4 g.), M.P. 113–114° C.

Methylation of this acid in alkaline solution with dimethylsulphate gave N-(4-methylsulphonylbenzyl)-4-nitropyrazole as colourless prisms, M.P. 190–192° C.

The present invention includes within its scope pharmaceutical compositions comprising one or more of the compounds of Formula I and a significant amount of a pharmaceutical carrier which may be either a solid material or a liquid. In actual practice the compounds of the present invention will normally be administered orally, in consequence of which the preferred formulations are those of the kind suitable for oral administration.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of the invention with or without the addition of diluents or excipients.

For topical application the active material may be incorporated in a suitable vehicle such as a cream, ointment, lotion or suspension, or in a pessary or ovule.

The percentage of active ingredient in the compositions of the invention may be varied, it being necessary that it should constitute a proportion such that a suitable dosage shall be obtained. Obviously several unit dosage forms may be administered at about the same time. A suitable dosage when administered orally for the treatment of trichomoniasis is 600 mg. of active substance per day. The following example illustrates pharmaceutical compositions according to the invention.

*Example IX*

Tablets were prepared of the formula:

|   | Percent |
|---|---|
| N-(4-methylsulphonylbenzyl)-4-nitropyrazole | 78.4 |
| Starch | 14.2 |
| Dextrin | 5.5 |
| Sodium carboxymethylcellulose | 0.88 |
| Stearic acid | 0.6 |
| Magnesium stearate | 0.42 |

(wherein the percentages are by weight).

Similarly there may be prepared pharmaceutical compositions in the form of tablets in which the pyrazole compound specified in the preceding example is replaced by a like quantity of the pyrazole product of any one of Examples II to VIII.

I claim:
1. N-(4-methylsulphonylbenzyl)-4-nitropyrazole.
2. N-(2-methylsulphonylbenzyl)-4-nitropyrazole.
3. As a new composition of matter a compound of the formula:

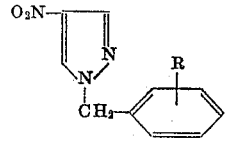

wherein R is alkylsulphonyl containing at most six carbon atoms.

References Cited in the file of this patent

Finar et al.: Chem. Abstracts, vol. 51, col. 17891–2 (1957).